Sept. 2, 1952     H. E. BOGE     2,609,319
LAMINATED PIPE AND PROCESS OF MAKING SAME
Filed Jan. 5, 1949
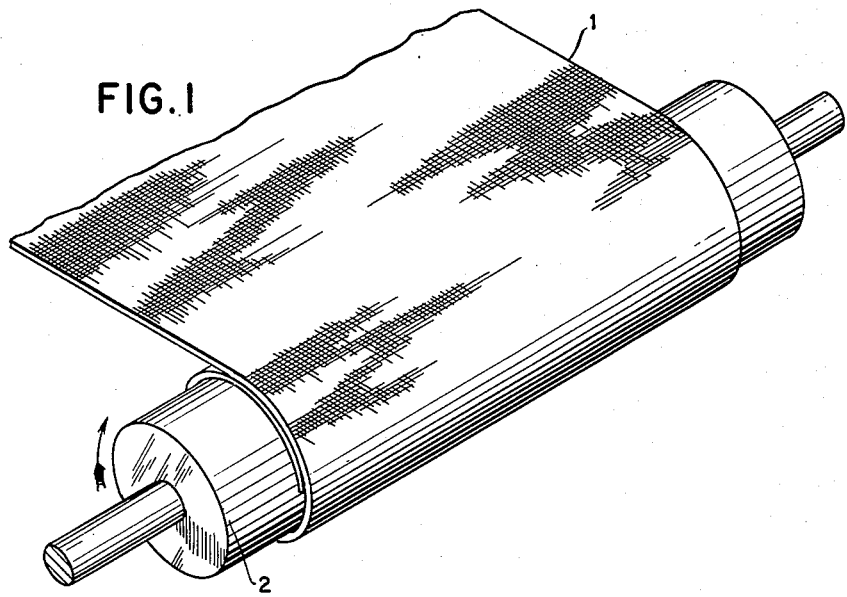
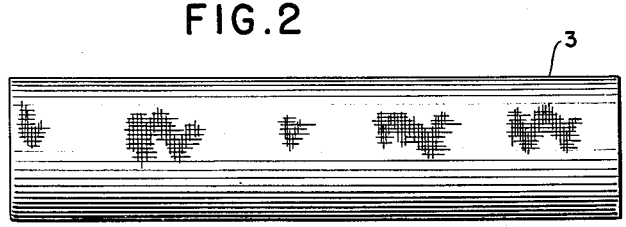
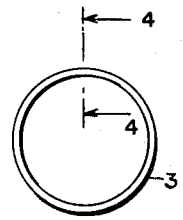
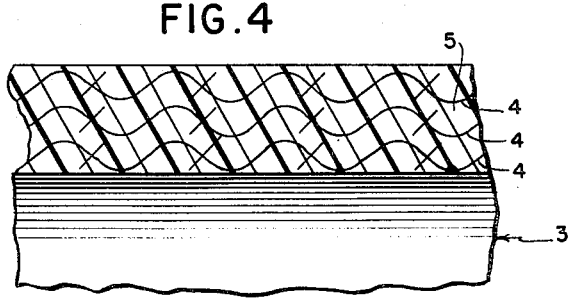
INVENTOR.
Herbert E. Boge
BY
Adams, Forward and McLean
ATTORNEYS Patented Sept. 2, 1952

2,609,319

UNITED STATES PATENT OFFICE 2,609,319

LAMINATED PIPE AND PROCESS OF MAKING SAME

Herbert E. Boge, Niagara Falls, N. Y., assignor to Mathieson Chemical Corporation Application January 5, 1949, Serial No. 69,403

7 Claims. (Cl. 154—83)

The present invention relates to laminated, plastic-impregnated structures of novel composition and having novel physical properties. The invention provides improved structures of surprisingly great strength and also provides an improved method whereby the structures may advantageously be produced.

The product of the invention is prepared by laminating glass cloth impregnated with a novel polymerizable composition which I have found to have the unique characteristic of forming on polymerization a tenacious bond with the glass fiber but to have little or no adherence to polished metal surfaces, and polymerizing the monomeric constituents of the impregnating composition. The invention is of especial utility in the manufacture of pipe or tubing or similar hollow structures for use as conduits in place of steel, iron or other metal tubing.

It is known that plastic pipe may be manufactured by impregnating various materials such as paper, textiles and the like, with certain polymerizable compositions, winding such impregnated material on a suitable mandrel, polymerizing the composition and removing the resultant pipe from the mandrel. In some cases, it is desirable to mold the pipe after rolling on the mandrel, for example, by pressing between the two halves of a split mold while at an elevated temperature. In other cases, the pipe is sufficiently finished without a subsequent molding step. In either case, it is necessary finally to remove the mandrel from the pipe.

In the past, phenol-formaldehyde or urea-formaldehyde resins have been suggested for these purposes. However, the phenolic resins have a dark color which for some purposes is objectionable. Also, in use at elevated temperatures they form objectionable fumes and odors. Dermatitis may be caused by those resins in their partly polymerized state. The urea-formaldehyde resins are of relatively light color but they have less desirable physical properties and have poor adhesion to glass fibers. Like the phenolics, they have a high water absorption which is undesirable for the present purposes. Thermoplastic resins generally have too low a heat of distortion and they adhere strongly to the metallic mandrel. It is surprising, therefore, to find that the compositions of the present invention may readily be removed from the mandrel even when little or no parting agent is used, that my polymerizable impregnating compositions wet glass fibers more thoroughly, form an exceptionally strong bond therewith and result in pipe having excellent physical properties.

The polymerizable impregnating compositions of my invention may, with advantage, be prepared by dissolving polymeric nuclear dichlorostyrene in monomeric nuclear dichlorostyrene and adding to the solution a further constituent, hereinafter described. While individual isomers of the nuclear dichlorostyrenes may be used for this purpose, it is generally more economical, and wholly satisfactory, to use a mixture of isomers, for example, a mixture such as described in United States Letters Patent No. 2,432,737.

Such monomeric nuclear dichlorostyrenes may be polymerized by known methods and the resultant polymers dissolved in a further amount of the monomeric nuclear dichlorostyrenes in proportions to give the desired viscosity. To the resultant solution there is added a small amount, suitably 0.1% to 10%, based on the weight of the solution, of a so-called cross-linking agent. As the cross-linking agent, I prefer to use a divinyl benzene but allyl esters of dibasic organic acids, including, for instance, diallyl phthalate and diallyl maleate, may likewise be used with advantage. Usually I prefer to use from 0.5% to 5% of the cross-linking agent. Smaller proportions have in some instances been found less satisfactory with respect to the parting of the molded product from the metal form and higher proportions may, in some cases, lead to somewhat less desirable physical properties of the laminated tubing.

Depending upon the conditions to which the impregnating solution is to be subjected prior to use and the period of time between preparation and use, it may be desirable to include in the solution one of the known polymerization inhibitors so as to prevent polymerization of monomeric constituents prior to use. Before use, the inhibitor may be removed from the solution by known methods, but this is usually unnecessary as, in general practice, the addition of a relatively small amount of a polymerization catalyst to the solution just prior to use will promote ready polymerization regardless of the presence or absence of an inhibitor. It is usually advantageous to add to the solution a small amount of polymerization catalyst, for instance, benzoyl peroxide just prior to use. In general, the proportion of catalyst, where used, should be within the range of 0.05 to 3% by weight, depending upon the rate of polymerization desired and whether or not a polymerization inhibitor is present.

In preparing the tubing of my present invention, glass cloth is impregnated with the solution, advantageously catalyzed, and the impregnated glass cloth is wound on a rotating mandrel to a suitable thickness, depending upon the desired thickness of the pipe walls. The mandrel and laminate are then heated to a suitable temperature adapted to bring about substantially complete polymerization of the monomeric nuclear dichlorostyrene present in the impregnating solution.

After this polymerization step, the resultant plastic tubing must be removed from the mandrel. This may readily be accomplished by cooling the mandrel and tubing and driving the mandrel from the tubing, for instance, by driving it into a snugly fitting piece of pipe, leaving behind the polymerized laminate. The operation of removing the mandrel from the polymerized plastic structure is greatly facilitated by the present invention since my impregnating composition when polymerized has very little adherence to the polished metal surface of the mandrel.

Past efforts to manufacture laminated pipe by a similar method have resulted in plastic compositions adhering to the mandrel so strongly that the resultant laminated pipe was usually destroyed or at least damaged as a result of efforts to remove it from the mandrel. Even where thermosetting resins have been used as the bonding resin, removal of the pipe from the mandrel has usually been quite difficult, and where thermoplastic resins have been similarly used, removal of the resultant pipe from the mandrel without damage has been practically impossible.

The cross-linking agent is an essential ingredient of my impregnating solution. Polymerized dichlorostyrenes containing no cross-linking agent do not permit the ready removal of the mandrel. Polystyrenes and polyesters generally adhere too strongly to the mandrel for satisfactory use in making laminated tubing. Though other cross-linking agents may be used, I have found divinyl benzenes to be particularly effective in promoting the ready removal of the mandrel from the polymerized laminate.

The proportion of polymeric nuclear dichlorostyrenes to monomeric nuclear dichlorostyrenes in my impregnating solution is also of importance, though some variation in proportions is permissible. The optimum proportions will usually depend upon the molecular weight of the polymeric constituent of the monomer-polymer solution. In preparing the impregnating solution, it is usually convenient to prepare first the monomer-polymer solution, advantageously also containing a small proportion of a known polymerization inhibitor, the proportion of monomer to polymer being such as to form a solution having a viscosity of 3,000±300 centipoises at 25° C. Approximately 3,000 centipoises has been found highly satisfactory from the standpoint of ease of impregnation but, under some operating conditions, viscosities of 1,000 to 5,000 centipoises may be used. The proportion of polymer in the solution may, with advantage, vary within the range of about 15 to 30% by weight as the molecular weight of the polymer constituent varies from 175,000 to 50,000. The proportion of polymers required to give a solution having a viscosity of 3,000 centipoises may in fact vary within the range of 15 to 50%, depending upon molecular weight of the polymers. In general, I have found it more advantageous to use about 25% of polymer having a molecular weight of 110,000±20,000 and where a more viscous composition is desired further to increase the proportion of the polymerized dichlorostyrene constituent.

After the monomer-polymer solution has been prepared, the cross-linking agent, advantageously divinyl benzene, is added. Divinyl benzene is generally available as a 60% solution in paraethylstyrene and a small amount of diethyl benzene. In the illustrations of my invention set forth herein, the proportions given are in terms of the divinyl benzene actually contained in the solution.

If the impregnating solution is to be promptly used, no polymerization inhibitor may be required, but normally a polymerization inhibitor is, with advantage, included in the solution. Suitable inhibitors for this purpose include, for instance, ditertiary butyl catechol, amylhydroquinone, diamylhydroquinone, and tertiary butyl catechol among others. I generally prefer, however, to use ditertiary butyl catechol for this purpose because it is readily soluble in the dichlorostyrenes and is particularly effective in inhibiting polymerization of these highly active nuclear dichlorostyrenes.

As previously noted, it is usually desirable to add a small amount of polymerization catalyst to the impregnating solution just before impregnating the glass cloth therewith. As previously noted, benzoyl peroxide may be used with particular advantage for this purpose, but other soluble peroxide catalyst may be used, including, for instance, acetyl peroxide and acetyl benzoyl peroxide.

The resin binder of the pipe or tubing of the present invention is not a thermoplastic resin. It will not support combustion but will decompose before melting. The pipe does not become delaminated during ordinary heavy use or as a result of removing it from the mandrel, due in part, no doubt, to the tenacious adherence of the resin to the glass fibers. The resultant pipe has also been found to have a surprisingly high bursting strength comparable with that of steel and also a surprisingly high tensile and compression strength, both axially and diametrically.

Though the pipe of my present invention may be readily removed from the mandrel even when no parting agent is applied to the mandrel before winding, it is frequently desirable to apply a parting agent further to facilitate removal. Suitable agents for this purpose are readily available to the industry. Parting agents which I have found especially suitable are those of the type containing a silicone resin.

Figure 1 illustrates winding the impregnated glass cloth about the mandrel to form a laminated structure.

Figure 2 is a side view of a length of tubing according to my invention and Figure 3 is an end view of such tubing.

Figure 4 is a longitudinal section of the tubing shown in Figures 2 and 3 taken at line 4—4 in Figure 3.

The reference numeral 1 designates a length of glass cloth which has been impregnated with a solution consisting essentially of polymeric nuclear dichlorostyrene in monomeric nuclear dichlorostyrene and containing between 0.1% and 10% by weight of divinyl benzene. Impregnated glass cloth 1 is wound about rotating mandrel 2 until a suitable thickness has been obtained after which it is polymerized by heating to a suitable temperature adjusted to bring about substantially complete polymerization of the impregnating solution.

When the solution has been completely polymerized, the laminate is removed from the mandrel as plastic tubing 3, illustrated in Figures 2, 3 and 4 of the drawing. Referring more particularly to Figure 4, it will be seen that laminations 4 of glass cloth 1 are firmly bound together by the resin 5 with the result that the pipe is not readily delaminated.

The invention will be further illustrated by the following specific examples. It will be understood, however, that the scope of the invention is not restricted to that specifically illustrated.

Example I

The impregnating composition used in this test was prepared from a solution of mixed isomeric nuclear dichlorostyrenes, the weight proportion of polymeric to monomeric nuclear dichlorostyrenes being 55 parts to 196.5 parts. The polymer constituent was prepared by mass polymerization of mixed isomeric nuclear dichlorostyrenes to obtain a polymer having an average molecular weight of 116,000. To 6 separate portions of the monomer-polymer mixture there was added divinyl benzene, the portions being designated samples 1 to 6, respectively. To sample 1, 0.3% of divinyl benzene was added. To sample 2, 0.6%; to sample 3, 1.2%; to sample 4, 1.8%; to sample 5, 2.4%; and to sample 6, 3% by weight of divinyl benzene was added. No divinyl benzene or other cross-linking agents was added to a further sample of the same composition designated 7. Just before use, 0.5% by weight of benzoyl peroxide catalyst was added to each of the samples. Each of the samples was used to impregnate a strip of glass cloth measuring 6 inches by 18 inches and the impregnated cloth was wrapped on a rotating chromium plated mandrel 2 inches in diameter and 10 inches in length, the mandrel having previously been coated with a silicone resin parting agent. In each instance, the mandrel with the impregnated glass cloth thereon was wrapped in cellophane and placed in an oven at 100° C. for 2½ hours to effect polymerization.

After removing from the oven, the laminated pipes of samples 1 to 6, respectively, were removed from the mandrels without difficulty by driving the mandrel into a steel pipe snugly fitting the mandrel. The laminated pipe prepared using the impregnated solutions of samples 5 and 6, respectively, were released more readily from the mandrel. The pipe prepared from the solution of sample 7, containing no divinyl benzene, could not be removed from the mandrel without breaking the pipe.

Example II

Seven samples of impregnating solutions identical with those described in Example I were prepared and laminated pipe made therefrom, as there described, except that another commercially available parting agent was used in place of the silicone resin. The seven samples were polymerized as described in Example I by heating to 100° C. for 2½ hours and were thereafter cooled to room temperature. In each case, excepting sample 7 which contained no cross-linking agent, the pipe was readily removed from the mandrel, but in order to remove the pipe of sample 7 from the mandrel, it was necessary to cut away the laminated structure.

Example III

Additional quantities of the impregnating compositions of samples 2 to 7, inclusive, of Example I were used as in that example except that the polymerization was effected by heating to 100° C. for 3¼ hours. The samples were then cooled until both the mandrel and the pipe were at room temperature and it was found that all of the samples were readily removed from the mandrel, except sample 7. In the case of sample 7, the laminae separated when attempts were made to drive the mandrel from the pipe.

Example IV

In the preceding examples, a parting agent was used to assist in the removal of the laminated pipe from the mandrel. In the present example, impregnating solutions identical with those of Example III were used but no parting agent was employed. Prior to winding, the mandrels were cleaned with carbon tetrachloride. In other respects, the tests were identical with those of Example I. Sample 7, which contained no cross-linking agent, could not be removed from the mandrel without cutting or tearing it off after polymerization. All of the other samples were readily removed from the mandrel.

Example V

To a monomer-polymer mixture of isomeric nuclear dichlorostyrenes having a viscosity of 3,000 centipoises at 25° C. there was added 1.2% of divinyl benzene, and 0.5% of benzoyl peroxide. Glass cloth was fed through this solution over an apron at 180° F. and wrapped on a mandrel rotating at 1 R. P. M. and heated to 212° F. by internal steam lines. Seventeen layers of cloth were thus applied to the mandrel and thereafter the mandrel, with the impregnated cloth wrapped thereon, was heated for one hour at 212° F. The pipe and mandrel were then cooled to room temperature by passing water through the mandrel. The resultant pipe was readily removed from the mandrel and on testing under hydrostatic pressure, internally, was found to have a bursting strength of 1100 pounds p. s. i. Its tensile strength axially was 33,510 pounds p. s. i. and its compression strength axially was 16,650 pounds p. s. i. The wall thickness of the pipe was about ⅛ inch.

Example VI

A more viscous impregnating solution was prepared by blending 80% of the monomer-polymer solution of Example I, having a viscosity of 3,000 centipoises, with 20% of a more viscous monomer-polymer solution containing 50 parts of polymeric dichlorostyrenes of molecular weight about 110,000 and 100 parts of monomeric mixed nuclear dichlorostyrenes. To the resultant solution, there was added 1.6% of divinyl benzene and 0.5% of benzoyl peroxide. The mandrel was coated with a silicone resin and rotated at ½ R. P. M. with heating and subsequent cooling as described in Example V. The resultant pipe parted readily from the mandrel. Upon testing it was found that the bursting strength of the pipe was 1600 pounds p. s. i. Its axial tensile strength was 13,160 pounds p. s. i. and its axial compressive strength was 13,520 pounds p. s. i. Its water absorption, determined by Test Method D-570-42 prescribed by the American Society for Testing Materials was 0.23%. The composition of this pipe was 64.9% glass and 35.1% resin.

Example VII

A pipe was prepared as in the preceding Example VI using as the impregnating solution a mixture of 100 parts of the monomer-polymer mixture having a viscosity of 3,000 centipoises at 25° C. and 50 parts of the more viscous monomer-polymer solution, described in the preceding Example VI. To the resultant solution there was added 0.6% of divinyl benzene and 0.5% of benzoyl peroxide. The glass cloth impregnated with the solution was wound on a steam-heated mandrel during a period of 2.5 minutes and was then heated under infra-red lamps at 180–190° F. for 45 minutes while rotating the mandrel ¼ turn every five minutes. The resultant pipe was easily removed from the mandrel and was found by test to have a bursting strength of 1800 pounds p. s. i. and a water absorption of only 0.11%.

*Example VIII*

A monomer-polymer solution was prepared using 85 parts of the more viscous monomer-polymer solution of Example VI and 15 parts of the 3,000 centipoise viscosity monomer-polymer solution of Example V. To this solution there was added 0.6% of divinyl benzene and 0.5% of benzoyl peroxide. A pipe was prepared as described in Example VI from glass cloth and was parted readily from the mandrel and found by test to have a diametrical tensile strength of 41,800 pounds p. s. i., an axial tensile strength of 15,490 pounds p. s. i., a bursting strength of 2,000 pounds p. s. i. and a water absorption of only 0.12%.

The glass cloth used in each of the foregoing examples was a square woven fabric, marketed by Owens-Corning Fiberglas Corporation of Toledo, Ohio, under the trade name Fiberglas Cloth #128. This cloth weighed 0.67 ounce per square foot. Its normal breaking strength along the warp was 250 pounds per inch in width and along the fill 200 pounds per inch in width.

I claim:

1. A laminated pipe composed of laminations of glass cloth bound together by a resin which is a polymer of a reaction mixture consisting essentially of a solution of polymeric nuclear dichlorostyrene in monomeric nuclear dichlorostyrene and a minor proportion of a cross-linking agent.

2. A laminated pipe composed of laminations of glass cloth bound together by a resin which is a polymer of a reaction mixture consisting essentially of a solution of polymeric nuclear dichlorostyrene in monomeric nuclear dichlorostyrene and a minor proportion of divinyl benzene.

3. The product of claim 2 in which the proportion of divinyl benzene is within the range of 0.1% and 10% based on the weight of the monomeric and polymeric dichlorostyrene constituents.

4. A laminated pipe composed of laminations of glass cloth bound together by a resin which is a polymer of a reaction mixture consisting essentially of a solution of polymeric nuclear dichlorostyrene in monomeric nuclear dichlorostyrene in proportion such that the solution has a viscosity of about 3000 centipoises at 25° C. and a minor proportion of a cross-linking agent.

5. A process for manufacturing plastic pipe which comprises impregnating glass cloth with a solution consisting essentially of polymeric nuclear dichlorostyrene in monomeric nuclear dichlorostyrene and containing 0.1% to 10% by weight of divinyl benzene, winding the impregnated cloth onto a mandrel, polymerizing the monomeric constituents of the impregnating solution and removing the mandrel from the pipe.

6. The process of claim 5 in which the proportion of polymeric to monomeric nuclear dichlorostyrene in the impregnating solution is such as to result in a solution having a viscosity of about 3,000 centipoises at 25° C.

7. A process for manufacturing plastic pipe which comprises impregnating glass cloth with a solution consisting essentially of polymeric nuclear dichlorostyrene in monomeric nuclear dichlorostyrene and containing 0.1% to 10% by weight of a cross-linking agent, winding the impregnated cloth onto a mandrel, polymerizing the monomeric constituents of the impregnating solution and removing the mandrel from the pipe.

HERBERT E. BOGE.

REFERENCES CITED

The following references are of record in the file of this patent:

UNITED STATES PATENTS

| Number | Name | Date |
| --- | --- | --- |
| 2,366,008 | D'Alelio | Dec. 26, 1944 |
| 2,402,040 | Goldman | June 11, 1946 |
| 2,406,319 | Brooks | Aug. 27, 1946 |
| 2,414,125 | Rheinfrank, Jr. | Jan. 14, 1947 |
| 2,462,555 | Rosenthal | Feb. 22, 1949 |

OTHER REFERENCES

Plastics, Nov. 1946, pages 34, 85–86, "Aircraft Feature New Laminates."